Dec. 18, 1962     H. I. BLACKMORE     3,068,517
EXTRUSION APPARATUS

Filed May 18, 1960     2 Sheets-Sheet 1

HAROLD I. BLACKMORE
INVENTOR

BY *Flehr and Swain*
ATTORNEY

Dec. 18, 1962   H. I. BLACKMORE   3,068,517
EXTRUSION APPARATUS
Filed May 18, 1960   2 Sheets-Sheet 2

HAROLD I. BLACKMORE
INVENTOR

BY *Flehr and Swain*
ATTORNEY

United States Patent Office 3,068,517
Patented Dec. 18, 1962

3,068,517
EXTRUSION APPARATUS
Harold I. Blackmore, 115 E. Creek Drive,
Menlo Park, Calif.
Filed May 18, 1960, Ser. No. 30,004
9 Claims. (Cl. 18—14)

This invention relates generally to an extrusion, apparatus suitable for the extrusion of thermoplastic resins.

Thin walled plastic tubing is generally formed by forcing a fluid thermoplastic resin through the orifice of an extrusion die. The fluid thermoplastic resin is generally forced through the die by means of an extrusion screw. For very thin walled tubing, a gas such as air is employed to expand the tubing as it leaves the orifice. The forces exerted by the gas are uniform on all walls, and the plastic expands in such a manner that the wall thickness remains substantially uniform. By controlling the extrusion rate, the orifice area and the gas pressure, the wall thickness may be maintained within narrow limits.

Extrusion dies of the prior art include a mandrel or pin, and a cup which surrounds the pin and is uniformly spaced therefrom to form a gap of predetermined diameter and width. The pin or mandrel is generally supported axially within the cup by radial support members (spiders).

During extrusion, the fluid thermoplastic resin separates as it flows past the supports in the die. It fuses together to form a continuous wall at the far side of the support. Although the supports may be made relatively thin, there is always a fusion line (spider mark); thus, the finished tubing is not homogeneous. In general, the wall thickness at the fusion marks is thinner than that of the remainder of the tubing. This is particularly true when the tubing is expanded to form a thin walled tubing. To form tubing having a given strength, it is required that the weakest point be at least able to withstand the forces applied. The fusion lines are generally thinner, thus requiring additional material for the remainder of the tubing to give the desired strength at the fusion line. As a result, optimum economy of material is not achieved.

As described above, the thermoplastic material is fed through the die by an extrusion screw. Generally, this is accomplished by use of helical screws which are disposed to rotate within a cylindrical chamber. The material is fed in at one end and driven by the screw toward and through the die. The screw tends to mix the thermoplastic material as it is driven. However, due to the large hold-up volume, there are places where there may be little or no mixing. Thus, the material entering the extrusion die may not be homogeneous.

It is a general object of the present invention to provide apparatus for manufacturing an improved thermoplastic resin tubing.

It is still another object of the present invention to provide an extrusion apparatus which is simple and inexpensive in construction and reliable in operation.

It is another object of the present invention to provide an extrusion apparatus having novel feed means for feeding the thermoplastic resin through the extrusion die.

It is still another object of the present invention to provide an extrusion apparatus in which the thermoplastic resin is continuously mixed as it is fed to the extrusion die to provide a homogeneous mixture at the die.

It is another object of the present invention to provide an extrusion die in which the pin or mandrel is supported independently of the cup whereby fusion (spider) lines are eliminated.

It is another object of the present invention to provide an apparatus in which the thermoplastic resin is driven by frictional driving forces.

These and other objects of the invention are, in general, accomplished by driving the thermoplastic resin by frictional forces created between the resin and a smooth surface moving relative thereto. A plate including a continuous channel is disposed to cooperate with the moving surface to form a tubular passage for guiding the thermoplastic resin. The resin is fed into one end of the tubular passage and driven by the moving plate toward and through the extrusion die. The frictional driving force between the moving plate and the resin serves to continuously mix the resin to supply a homogeneous material to the extrusion die. The material is then expanded as desired to form a tubing having homogeneous walls of substantially uniform thickness.

The foregoing and other objects of the invention will be more clearly understood from the following description taken in conjunction with the accompanying drawing.

Referring to the drawing.

Figure 1:
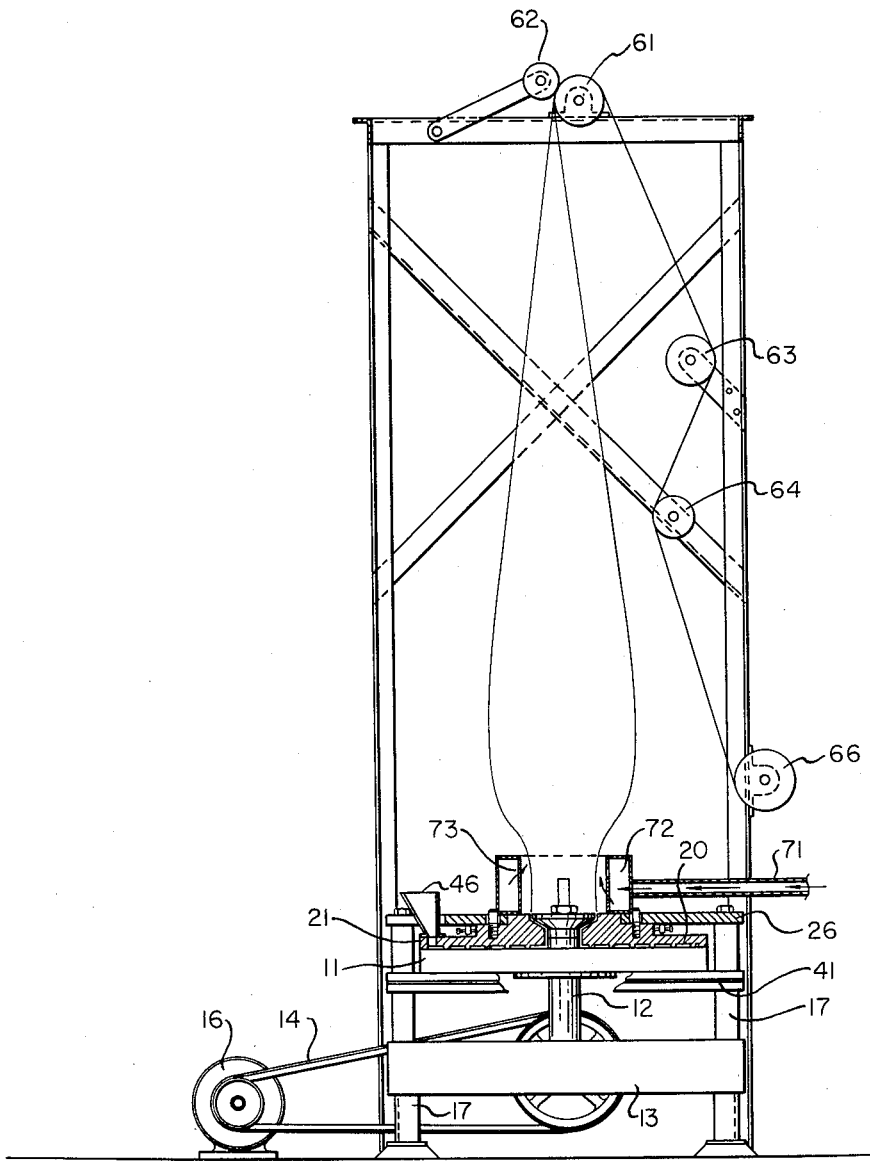
FIGURE 1 is an elevational view illustrating apparatus in accordance with the present invention.

Referring to the figures, the apparatus includes a driving member or plate 11 which is carried by a drive shaft 12. The drive shaft 12 may be driven from a suitable gear reduction box 13 to which power may be supplied by a belt 14 from a motor 16. It will be apparent that any suitable means may be employed for driving the plate 11. The driving plate 11 is disposed in substantially a horizontal position and rotated about its axis. The rotative speed at which the plate is driven is preferably adjustable to accommodate various materials and conditions. The plate 11 and associated driving means may be supported by spaced supports 17.

A stationary member 21 is adapted to cooperate with the driving plate 11. The member 21 is disposed above the driving plate 11 in opposition to its upper surface. The member 21 is provided with a continuous groove or channel 22. As illustrated, the channel is spiral in configuration with one end terminating near the axis of the member 21 and the other end terminating at the periphery. The channel 22 cooperates with the drive member 11 to form an elongated continuous tubular passage 20 which extends inwardly from near the outside of the driving member toward its axis.

The lower surface 23 of the member 21 is spaced slightly above the rotating member 11 whereby the member 11 may rotate with respect to the member 21. The spacing is such that fluid thermoplastic resin 24 travelling within the tubular passage 20 will not flow out of the passage. Thus, short circuiting of flow is minimized. The thermoplastic resin may provide a thin film between the members 11 and 21 which serves to lubricate the parts and reduce friction between them.

A plate 26 is secured to the upper ends of the supports 17. Spaced pins 27 are threaded to the member 21 and pass through enlarged holes 28 in the plate 26. Means are provided for centering the member 21. For this purpose, the holes 28 have a diameter greater than the pins 27. A plurality of spaced bosses 29 is provided on the plate 26. They receive adjusting screws 30 which abut and move the member 21.

As previously described, the inner end of the tubular passage terminates near the axis of the plate 11. The plate 11 is provided with a hub 31 which threadably receives a stud 32. The stud 32 is adapted to receive the mandrel or pin 33 of the die. The mandrel or pin is securely held by the nut 34. The member 21 is provided with an axial opening 36 which is adapted to receive the mandrel or pin. This opening serves as the cup portion of the extrusion die. The opening is such that there is a space between the member 21 and mandrel 33 through which the thermoplastic material is extruded.

In the example shown, the opening formed in the member 21 is in the form of an inverted cup with the pin having a mushroom shape, the two cooperating to form an annular orifice having a predetermined inner diameter and gap. The diameter of the orifice and the gap between the cooperating pin and mandrel is selected to give a tubing having a desired thickness. Suitable spacings and diameters for given feed rates to achieve tubing having desired wall thickness are known in the art and may also be achieved by trial and error. It is to be noted that in accordance with the present invention, the mandrel or pin is supported independently of the cup. Thus, there are no spiders (supports) to make the extruded tubing nonhomogeneous.

When extruding thermoplastic resins, it is necessary to maintain the temperature of the resin, the apparatus and extrusion dies, substantially constant within predetermined limits. The mean temperature and permissible variation in temperature is dictated by the type of thermoplastic resin. To maintain the temperature, the apparatus can be placed in an oven, or heat may be applied by other means. In the example shown, the apparatus is heated by a radiant heater 41. Suitable temperature sensing means (not shown) may be provided for detecting the temperature of the apparatus. The temperature detecting means may be connected in an electrical control circuit which, in turn, controls the power applied to the radiant heater (thus the heat supplied to the apparatus) to thereby maintain the apparatus a substantially constant predetermined temperature.

Thermoplastic resin is available in a granular or pelletized form. The pelletized resin may be continuously fed into a funnel 46 which directs the resin into the tubular passage. The frictional force between the member 11 and the resin drives the resin along the passage toward the extrusion die.

To form thin walled tubing, the extruded thermoplastic resin is expanded. This is, in general, accomplished by introducing a charge of gas into the extruded tubing. For this purpose, an axial opening 47 may be provided in the mandrel and drive shaft. As the material is extruded, the free end is sealed and the charge of gas is increased until a desired charge is introduced to expand the tubing to the desired size. The supply is then turned off. The charge will remain since one end of the extruded tubing is closed and the supply is turned off.

The pinching is continuous during extrusion since the tubing travels over a driven roll 61 which has an idler roll 62 cooperating therewith. The tubing is drawn upwardly by the driven roll. The material then travels over idler rolls 63 and 64 and is rolled onto a take-up roll 66 which may also be driven.

A cooling means is provided for reducing the temperature of the tubing as it leaves the orifice. For example, cooling air may be supplied along the tube 71 into the annular chamber 72 which is provided with openings 73 to direct the cooling air over the tubing.

Figure 2:
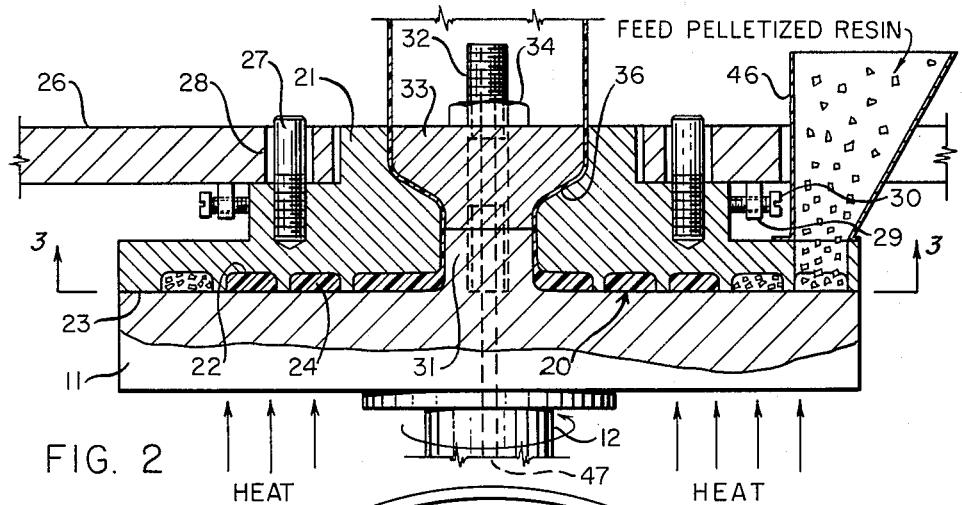
FIGURE 2 is an enlarged view of the feed means and extrusion die of the instant application.
Figure 3:
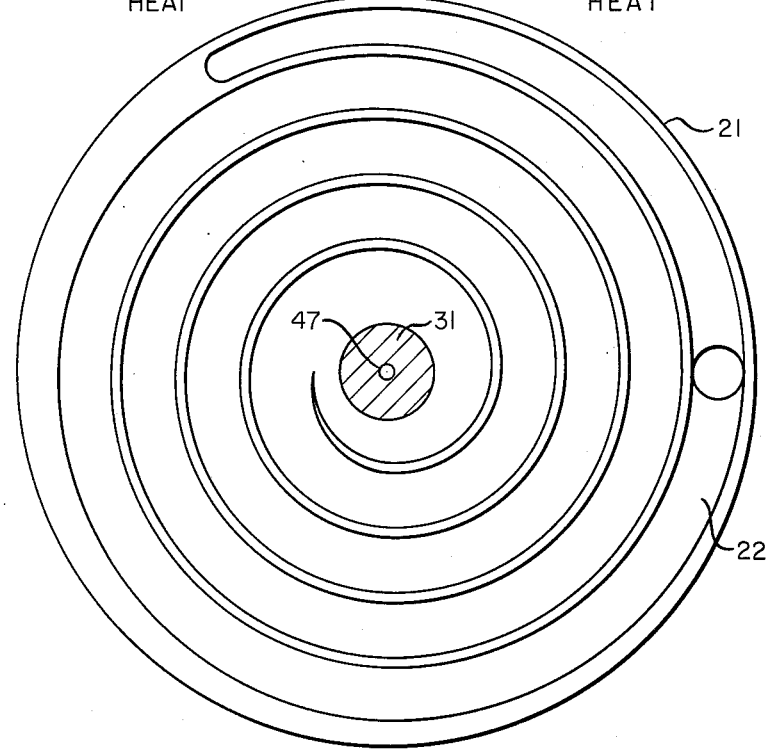
FIGURE 3 is a plan view taken along the line 3—3 of FIGURE 2.

Operation of the apparatus to form a thin thermoplastic tubing is substantially as follows: The apparatus is energized whereby the member 11 is caused to rotate at a predetermined speed and the apparatus is brought up to temperature. Pelletized resin is then fed into the funnel 46 and drops into one end of the tubular passage. The friction forces between rotating member 11 and the resin tend to carry the same along the tubular passage. The apparatus is maintained at a temperature above the temperature at which the thermoplastic resin becomes fluid, the pelletized material will rise in temperature and become fluid. As illustrated in FIGURE 2, the pelletized material has travelled a short distance along the tubular passage before becoming fluid. It is, of course, to be understood that this is merely illustrative and that the pelletized material may become fluid sooner or later depending upon the temperature of the apparatus and the melting temperature of the resin being used.

The friction forces between the fluid and the plate 11 serve to drive the fluid resin along the passage. The material adjacent the plate 11 will tend to move faster than the material spaced further therefrom. This difference in speed gives rise to a mixing action. Thus, the resin is continuously mixed as it is fed towards the extrusion die. The material arriving at the extrustion die is substantially homogeneous.

It is to be observed that the resin near the outer periphery is in contact with a surface of the plate 11 which is travelling at a greater linear velocity than that at the center. Thus, there is a tendency for pressure to build up at the axial end of the passage. The pressure build-up is sufficient to extrude the resin through the die. The pressure may be controlled by controlling the speed of rotation of the plate 11 and the spacing between the plate 21 and rotating plate 11.

The resin leaving the orifice is in the form of a tubing having a predetermined diameter and wall thickness. After a short length of material is extruded, the free end of the tube is sealed and gas under pressure is applied through the opening 47 while extrusion continues. After a predetermined charge of gas is disposed within the extruded tube, the gas supply is turned off. Generally, the correctness of charge is finally determined after the tubing is engaged by the driven roll 61.

The apparatus is then continuously operated and the action is such as to give a tubing of uniform diameter as it is continuously urged outwardly. In the event that breakage or a pin hole should form in the material being extruded, then this opening is closed and an additional charge of gas supplied to again achieve tubing of the desired diameter. Since there are no fusion or spider marks, the material leaving the die is substantially homogeneous and uniform in thickness. As a result, the expanded material will also be homogeneous and uniform.

The extrusion apparatus has been described with relation to extruding pelletized resin. It will be apparent that the resin fed into the passage may be fluid and that the apparatus will work in the same manner as described above.

Although in the embodiment shown, the mandrel or pin 33 rotates with the plate 11, the pin may be stationary with suitable bearings provided between the rotating plate 11 and the stationary shaft which supports the pin.

The grooves are illustrated as having substantial width in relation to depth and as being substantially U-shaped. It will be apparent that grooves of other configurations may be employed. Further, the grooves need not follow a spiral path. Other smooth paths may also be employed.

In one particular example, apparatus was constructed in accordance with the foregoing in which the plate 11 was made of steel and was 18 inches in diameter and 1¾ inches thick. The member 21 was provided with a spiral groove which had 4½ turns with the grooves being 1 inch wide and ⅜ inch deep. The pin or mandrel had an exterior diameter of 3.88 inches and the cooperating cup had a diameter of 4 inches to thereby provide an orifice with a gap of .060 inch.

Heat was applied to the apparatus to raise the temperature to 375° F. Pelletized polyethylene was fed continuously into the funnel 46 at a rate of 15 lbs. per hour. The plate was rotated at 4 r.p.m. A charge of gas was placed in the tubing until the tubing expanded to a diameter of 7½ inches. The apparatus was then continuously operated to form tubing which was .0015 inch thick and 7½ inches in diameter.

I claim:

1. An extrusion apparatus for extruding a resin comprising a plate having a relatively flat upper surface lying in a substantially horizontal plane and mounted for rotation about a vertical axis, a member including a continuous channel overlying said plate, said plate and member cooperating to form a continuous centrally directed tubular passage for guiding resin, means for feeding resin into one end of said tubular passage, said resin being driven through said passage by the friction between the rotating plate and the resin, an extrusion die disposed on the axis at the other end of said tubular passage serving to receive the resin flowing from the adjacent end of the tubular passage.

2. An extrusion apparatus as in claim 1 in which said extrusion die comprises a cup and an independently supported mandrel cooperating to form an extrusion orifice.

3. An extrusion apparatus as in claim 2 including additionally means for effecting a heat exchange with the apparatus to maintain the resin at a desired temperature.

4. An extrusion apparatus as in claim 3 including additionally means for effecting a heat exchange with the extruded resin.

5. An extrusion apparatus as in claim 2 in which said mandrel includes a passage to permit a gas to be applied to the interior of an extruded tube.

6. An extrusion apparatus for extruding a resin to form a tubing comprising a plate having a relatively flat upper surface disposed in a substantially horizontal plane, said plate being mounted for rotation about a vertical axis, a member disposed to cooperate with the upper surface of the plate, said member including a continuous channel beginning near the outside of the member and extending inwardly toward the axis, said plate and channel forming a tubular passage for guiding resin from the outside of the axis, means for feeding resin into the outside end of said passage, said resin being driven through said passage by the friction between the surface of the rotating plate and the resin, and an extrusion die disposed on the axis at the other end of said tubular passage serving to receive the resin flowing from the adjacent end of the tubular passage, said die including a cup and a mandrel supported independently of said cup.

7. An extrusion apparatus as in claim 6 in which said channel is spiral.

8. An extrusion apparatus as in claim 2 in which said mandrel is mounted for rotation with said plate.

9. An extrusion apparatus as in claim 6 in which said mandrel is supported for rotation with said plate.

References Cited in the file of this patent

UNITED STATES PATENTS

| 2,461,630 | Cozzo | Feb. 15, 1949 |
| 2,529,897 | Bailey et al. | Nov. 14, 1950 |
| 2,676,356 | Becker | Apr. 27, 1954 |

OTHER REFERENCES

British Plastics, April 1945, pp. 161–165.